United States Patent
Pan et al.

(10) Patent No.: US 11,102,673 B2
(45) Date of Patent: Aug. 24, 2021

(54) METHOD AND APPARATUS FOR DISTINGUISHING TRANSMISSION FEEDBACK MODE IN SIDELINK BUFFER STATUS REPORT IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/875,458

(22) Filed: May 15, 2020

(65) Prior Publication Data

US 2020/0367095 A1 Nov. 19, 2020

Related U.S. Application Data

(60) Provisional application No. 62/849,422, filed on May 17, 2019.

(51) Int. Cl.
*H04W 28/02* (2009.01)
*H04W 72/14* (2009.01)
*H04L 1/18* (2006.01)
*H04W 92/18* (2009.01)

(52) U.S. Cl.
CPC ....... *H04W 28/0278* (2013.01); *H04L 1/1819* (2013.01); *H04W 72/14* (2013.01); *H04W 92/18* (2013.01)

(58) Field of Classification Search
None
See application file for complete search history.

(56) References Cited

U.S. PATENT DOCUMENTS

| 2020/0314959 A1* | 10/2020 | Agiwal | H04W 92/18 |
| 2020/0344771 A1* | 10/2020 | Kang | H04W 76/14 |
| 2020/0351855 A1* | 11/2020 | Kung | H04L 1/1812 |
| 2021/0099901 A1* | 4/2021 | Huang | H04L 1/1812 |
| 2021/0136731 A1* | 5/2021 | Li | H04W 28/06 |

* cited by examiner

*Primary Examiner* — Anh Vu H Ly
(74) *Attorney, Agent, or Firm* — Skaar Ulbrich Macari, P.A.

(57) ABSTRACT

A method and apparatus are disclosed from the perspective of a UE (User Equipment) to handle a sidelink buffer status report (SL BSR). In one embodiment, the method includes the UE transmitting a SL BSR to a network node, wherein a format of the SL BSR includes at least one field of buffer size associated with HARQ (Hybrid Automatic Repeat Request) feedback enabled and one field of buffer size associated with HARQ feedback disabled. The method also includes the UE receiving a sidelink grant from the network node. The method further includes the UE selecting data from a logical channel for transmission according to a HARQ feedback mode of the logical channel and whether the sidelink grant is associated with a HARQ feedback resource or not.

17 Claims, 25 Drawing Sheets

| Destination index$_1$ | LCG ID$_1$ | Buffer Size$_1$ | Oct 1 |
|---|---|---|---|
| Buffer Size$_1$ | | Destination index$_2$ | Oct 2 |
| LCG ID$_2$ | Buffer Size$_2$ | | Oct 3 |

...

| Destination index$_{N-1}$ | LCG ID$_{N-1}$ | Buffer Size$_{N-1}$ | Oct 1.5*N-2 |
|---|---|---|---|
| Buffer Size$_{N-1}$ | | Destination index$_N$ | Oct 1.5*N-1 |
| LCG ID$_N$ | Buffer Size$_N$ | | Oct 1.5*N |

FIG. 7 (PRIOR ART)

| Destination index$_1$ | LCG ID$_1$ | Buffer Size$_1$ | | | | Oct 1 |
|---|---|---|---|---|---|---|
| Buffer Size$_1$ | | Destination index$_2$ | | | | Oct 2 |
| LCG ID$_2$ | Buffer Size$_2$ | | | | | Oct 3 |

...

| Destination index$_N$ | LCG ID$_N$ | Buffer Size$_N$ | | | | Oct 1.5*N-0.5 |
|---|---|---|---|---|---|---|
| Buffer Size$_N$ | R | R | R | R | | Oct 1.5*N+0.5 |

FIG. 8 (PRIOR ART)

| Codepoint/Index | LCID values |
|---|---|
| 00000 | CCCH |
| 00001-01010 | Identity of the logical channel |
| 01011-01111 | Reserved |
| 10000 | Extended logical channel ID field |
| 10001 | Reserved |
| 10010 | Activation/Deactivation of PDCP Duplication |
| 10011 | Hibernation (1 octet) |
| 10100 | Hibernation (4 octets) |
| 10101 | Activation/Deactivation of CSI-RS |
| 10110 | Recommended bit rate |
| 10111 | SC-PTM Stop Indication |
| 11000 | Activation/Deactivation (4 octets) |
| 11001 | SC-MCCH, SC-MTCH (see note) |
| 11010 | Long DRX Command |
| 11011 | Activation/Deactivation (1 octet) |
| 11100 | UE Contention Resolution Identity |
| 11101 | Timing Advance Command |
| 11110 | DRX Command |
| 11111 | Padding |

NOTE: Both SC-MCCH and SC-MTCH cannot be multiplexed with other logical channels in the same MAC PDU except for Padding and SC-PTM Stop Indication

FIG. 9 (PRIOR ART)

| Codepoint | Index | LCID values |
|---|---|---|
| 000000-000110 | 32-38 | Identity of the logical channel |
| 000111-111111 | 39-95 | Reserved |

FIG. 10 (PRIOR ART)

| Codepoint/Index | LCID values |
|---|---|
| 00000 | CCCH |
| 00001-01010 | Identity of the logical channel |
| 01011 | CCCH |
| 01100 | CCCH |
| 01101 | CCCH and Extended Power Headroom Report |
| 01110-01111 | Reserved |
| 10000 | Extended logical channel ID field |
| 10001 | Reserved |
| 10010 | AUL confirmation (4 octets) |
| 10011 | AUL confirmation (1 octet) |
| 10100 | Recommended bit rate query |
| 10101 | SPS confirmation |
| 0110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

FIG. 11 (PRIOR ART)

| Index | LCID values |
|---|---|
| 0 | CCCH |
| 1–32 | Identity of the logical channel |
| 33-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

FIG. 17 (PRIOR ART)

| Index | LCID values |
|---|---|
| 0 | CCCH of size 64 bits (referred to as "CCCH1" in TS 38.331 [5]) |
| 1–32 | Identity of the logical channel |
| 33–51 | Reserved |
| 52 | CCCH of size 48 bits (referred to as "CCCH" in TS 38.331 [5]) |
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

METHOD AND APPARATUS FOR DISTINGUISHING TRANSMISSION FEEDBACK MODE IN SIDELINK BUFFER STATUS REPORT IN A WIRELESS COMMUNICATION SYSTEM

CROSS-REFERENCE TO RELATED APPLICATIONS

The present application claims the benefit of U.S. Provisional Patent Application Ser. No. 62/849,422 filed on May 17, 2019, the entire disclosure of which is incorporated herein in its entirety by reference.

FIELD

This disclosure generally relates to wireless communication networks, and more particularly, to a method and apparatus for distinguishing transmission feedback mode in sidelink buffer status report in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment) to handle a sidelink buffer status report (SL BSR). In one embodiment, the method includes the UE transmitting a SL BSR to a network node, wherein a format of the SL BSR includes at least one field of buffer size associated with HARQ (Hybrid Automatic Repeat Request) feedback enabled and one field of buffer size associated with HARQ feedback disabled. The method also includes the UE receiving a sidelink grant from the network node. The method further includes the UE selecting data from a logical channel for transmission according to a HARQ feedback mode of the logical channel and whether the sidelink grant is associated with a HARQ feedback resource or not.

BRIEF DESCRIPTION OF THE DRAWINGS

FIG. 7 is a reproduction of FIG. 6.1.3.1a-1 of 3GPP TS 36.321 V15.3.0.

FIG. 8 is a reproduction of FIG. 6.1.3.1a-2 of 3GPP TS 36.321 V15.3.0.

FIG. 9 is a reproduction of Table 6.2.1-1 of 3GPP TS 36.321 V15.3.0.

FIG. 10 is a reproduction of Table 6.2.1-1a of 3GPP TS 36.321 V15.3.0.

FIG. 11 is a reproduction of Table 6.2.1-2 of 3GPP TS 36.321 V15.3.0.

FIG. 17 is a reproduction of Table 6.2.1-1 of 3GPP TS 38.321 V15.5.0.

FIG. 18 is a reproduction of Table 6.2.1-2 of 3GPP TS 38.321 V15.5.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.321 V15.3.0, "Evolved Universal Terrestrial Radio Access (E-UTRA); Medium Access Control (MAC) protocol specification"; R2-1900370, "Summary of Email Discussion [104 #58][NR V2X]—QoS support for NR V2X"; 3GPP RAN1 #95 Chairman's note; and TS 38.321 V15.5.0, "NR; Medium Access Control (MAC) protocol specification". The standards and documents listed above are hereby expressly incorporated by reference in their entirety.

Figure 1:
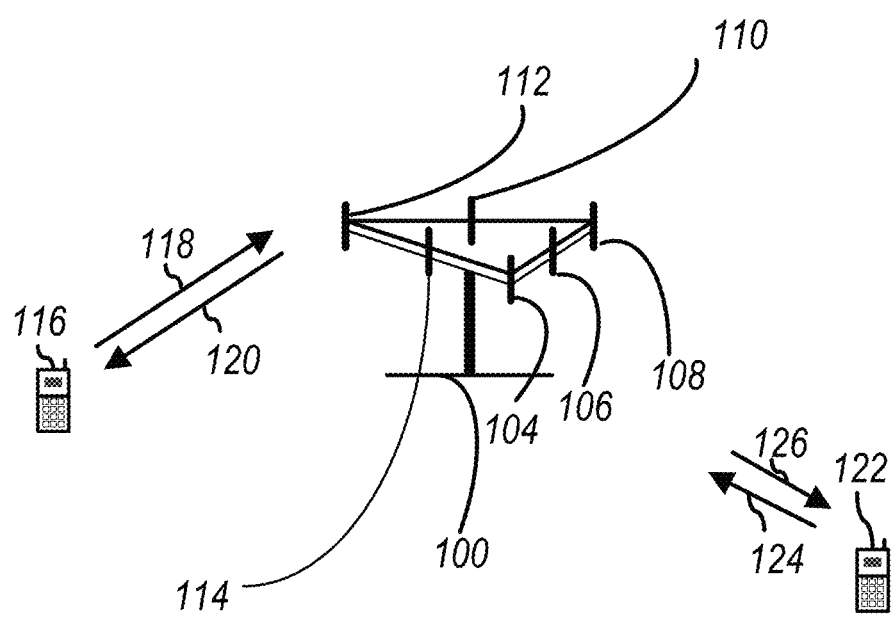
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
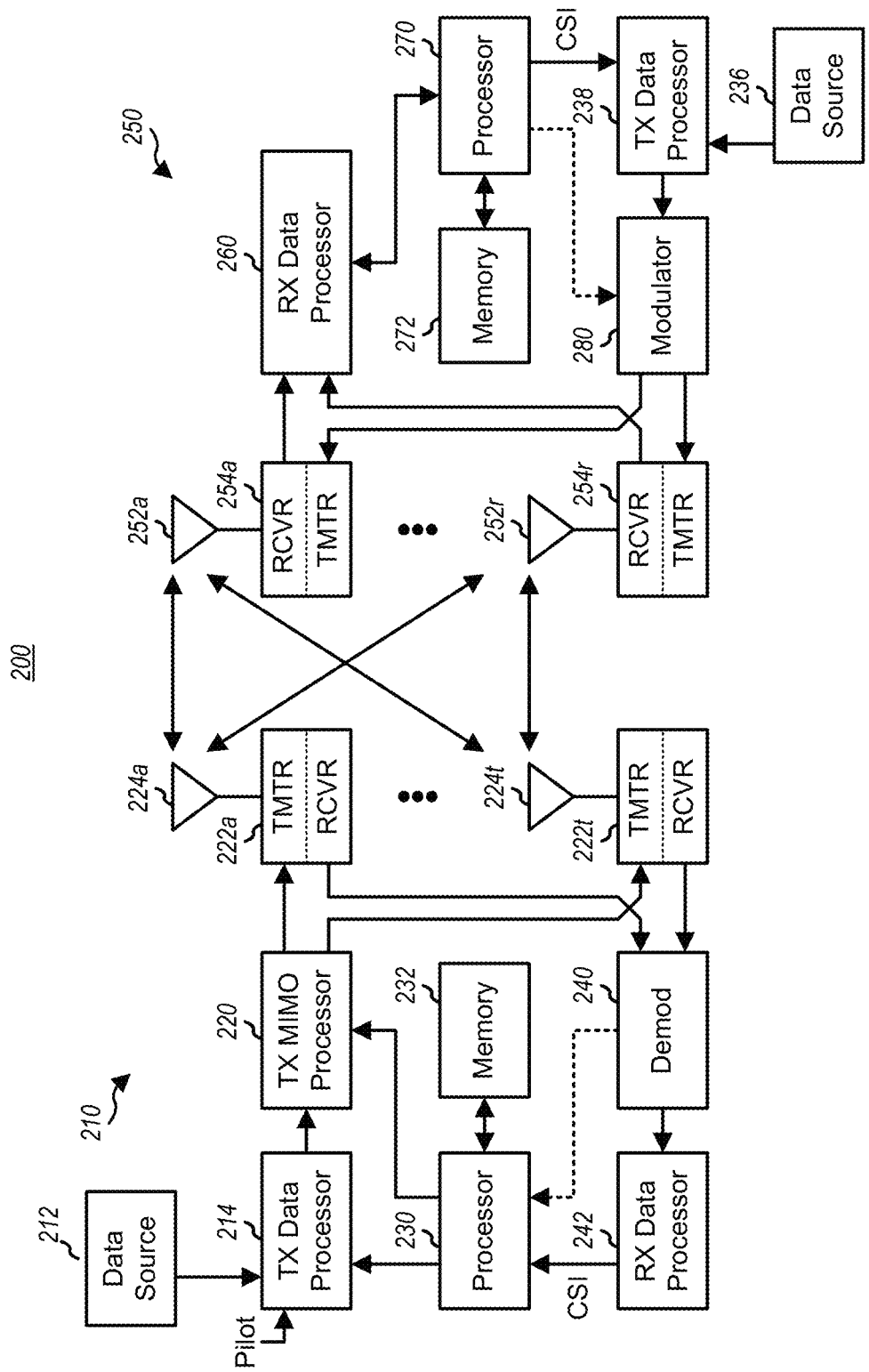
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
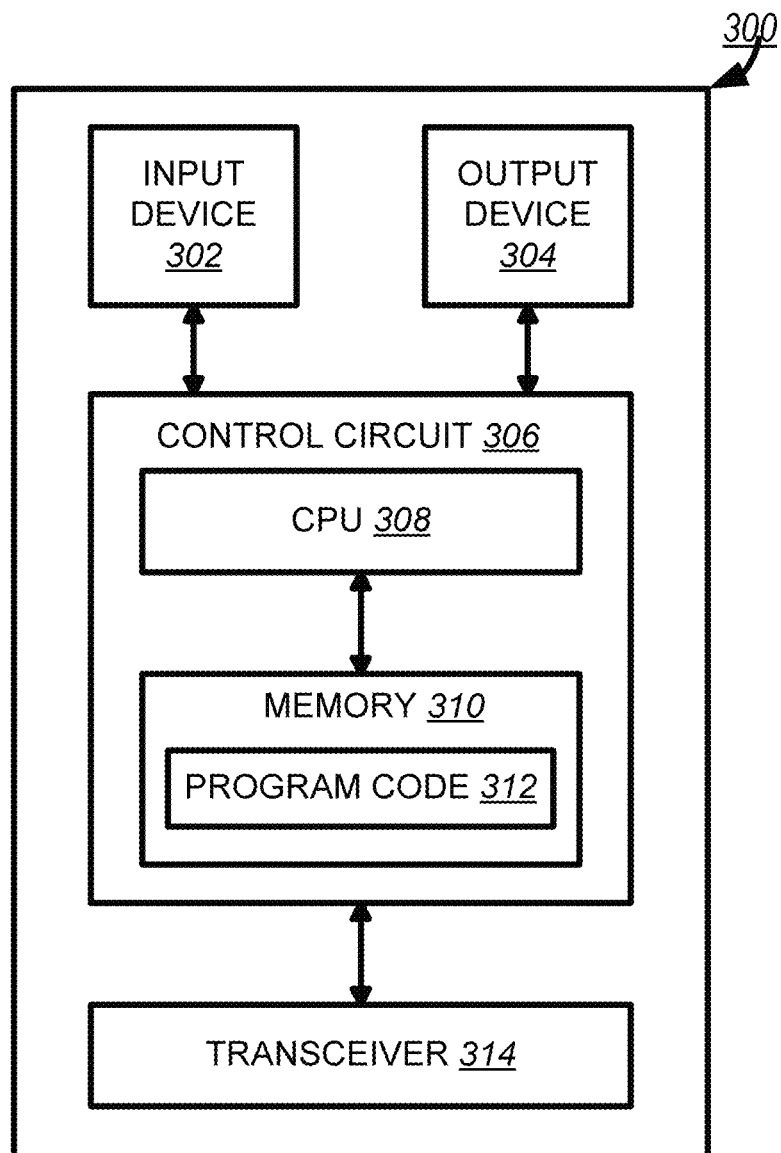
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
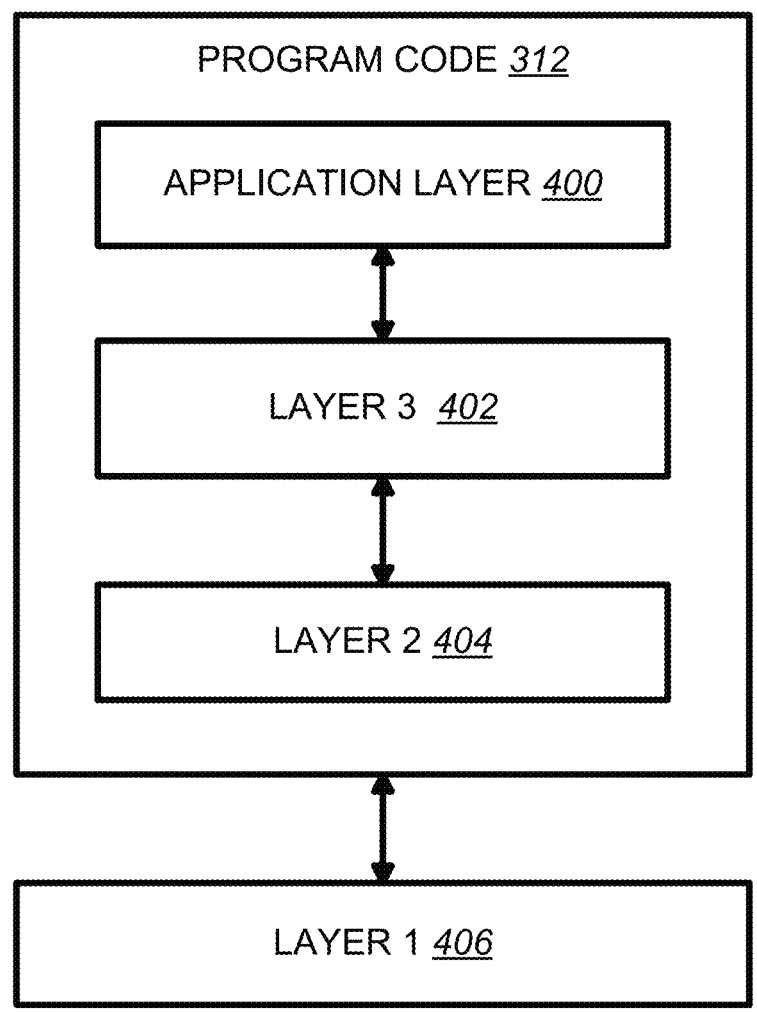
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

The appendix in 3GPP R2-1900370 described several candidate options for NW configured or pre-configured SLRB as follows:

Appendix: Candidate Options for NW
Configured/Pre-Configured SLRB

As per experience from LTE SL, UEs with different RRC states/resource allocation modes may depend on different ways of signaling and procedures for their SL (pre-)configuration (i.e. dedicated signaling, system information and pre-configuration). Therefore, options with different signaling flows are given below.

Figure 5:
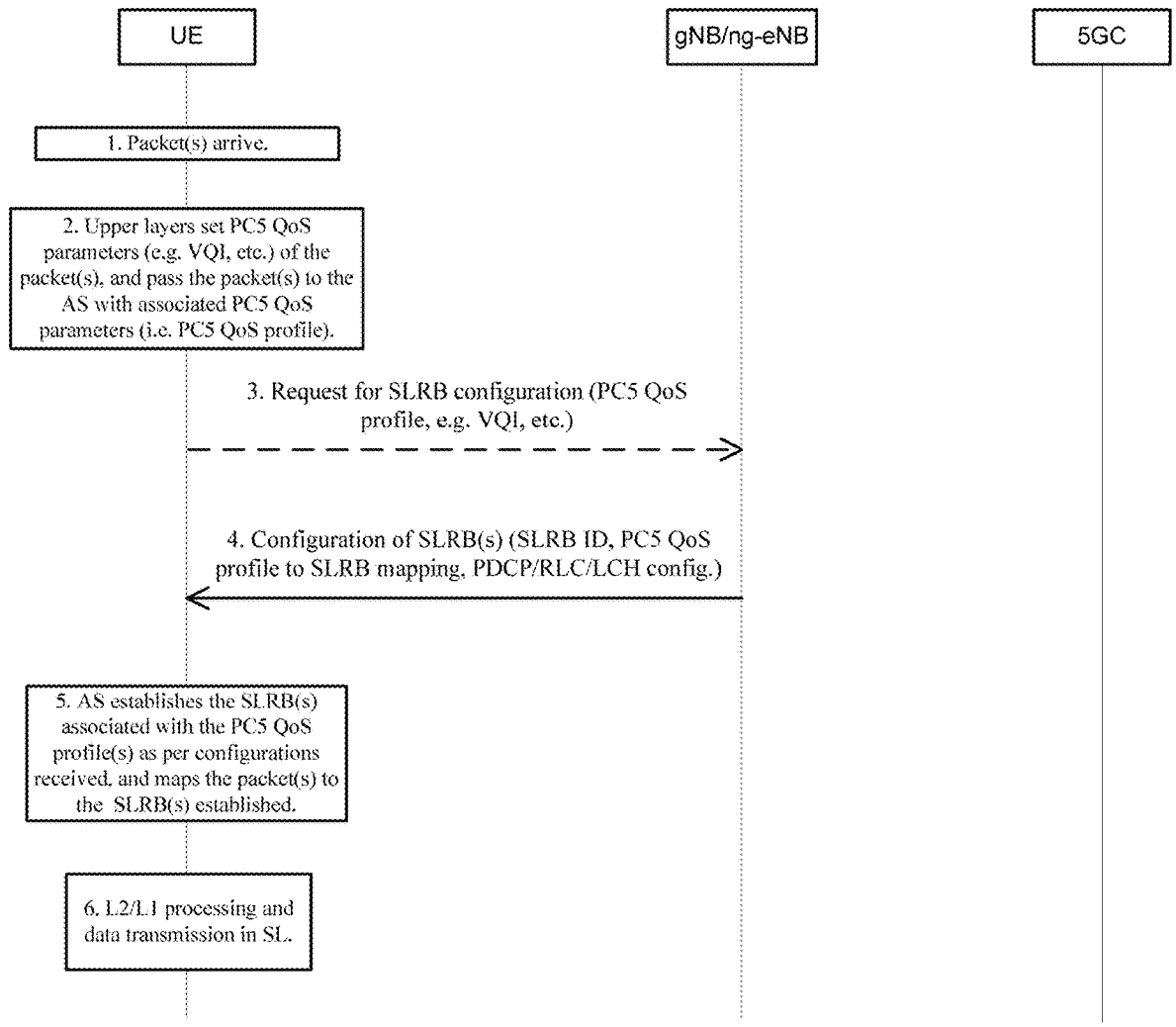
FIG. 5 is a reproduction of Figure A-1 of 3GPP R2-1900370.

Option 1
Figure A-1 of 3GPP R2-1900370, entitled "PC5 QoS profile based, UE specific configuration", is reproduced as FIG. 5
Since SA2 concluded to define VQI to represent the per-packet PC5 QoS parameters in TR 23.786 and indicates that the VQI of each V2X message (whenever applicable) is set by application layer [1], this option is based on such conclusions and further assumes that the PC5 QoS parameters (e.g. VQI, etc.[1]), namely PC5 QoS profiles[2], tagged on each V2X packet is also submitted to the AS (similar to legacy PPPP/PPPR) as in Step 2 above. In Step 3, the UE may report the PC5 QoS profiles of the packet(s) to the gNB/ng-eNB, and requests the configuration of the SLRB(s) associated with these PC5 QoS profile(s) reported. As a response, the gNB/ng-eNB may signal the configurations of the SLRB(s) associated with the PC5 QoS profile(s) reported; these SLRB configurations may include SLRB ID, PC5 QoS profile to SLRB mapping, SDAP/PDCP/RLC/LCH configurations, etc. In Step 5, the UE in the AS establishes SLRB(s) associated with the QoS profile of the packet(s) as per gNB/nb-eNB configuration, and maps the packet(s) to the SLRB(s) established. Afterward, SL transmission happens.

[1] Here, the specific PC5 QoS parameters in the figure include VQI and other potential QoS parameters identified by Q2, so that the "etc." placed here might be updated as per Q2 conclusion later (if the option itself is finally supported). This applies also to Option 3 &4 below
[2] Similar to Uu, the term "PC5 QoS profile" here means a set of PC5 QoS parameters, i.e. VQI and other potential QoS parameters from Q2.

Since SA2 assume that "non-standardized VQI is not supported in this release" in TR 23.786 [1], it is quite likely that, similar to 5QI used in NR Uu, the PC5 QoS parameters of each VQI are also standardized in the specification. Also, if VQI itself is regarded as not sufficient to reflect all PC5 QoS parameters in Q2, other necessary QoS parameters will be used together with VQI to form the PC5 QoS profile and reported to the RAN as well. Therefore, this option is characterized by enabling the UE to directly "tell" the QoS parameters of available packets in RAN to the gNB/ng-eNB which thus no longer needs to rely on CN to get aware of the QoS profiles of the UE's traffic as in Uu.
Applicability:
In this option, the gNB/ng-eNB configures SLRB depending on the PC5 QoS parameters of the actually packets available as reported by the UE, so it works in a UE-specific manner and is applied to RRC_CONNECTED UEs.
Option 2

Figure 6:
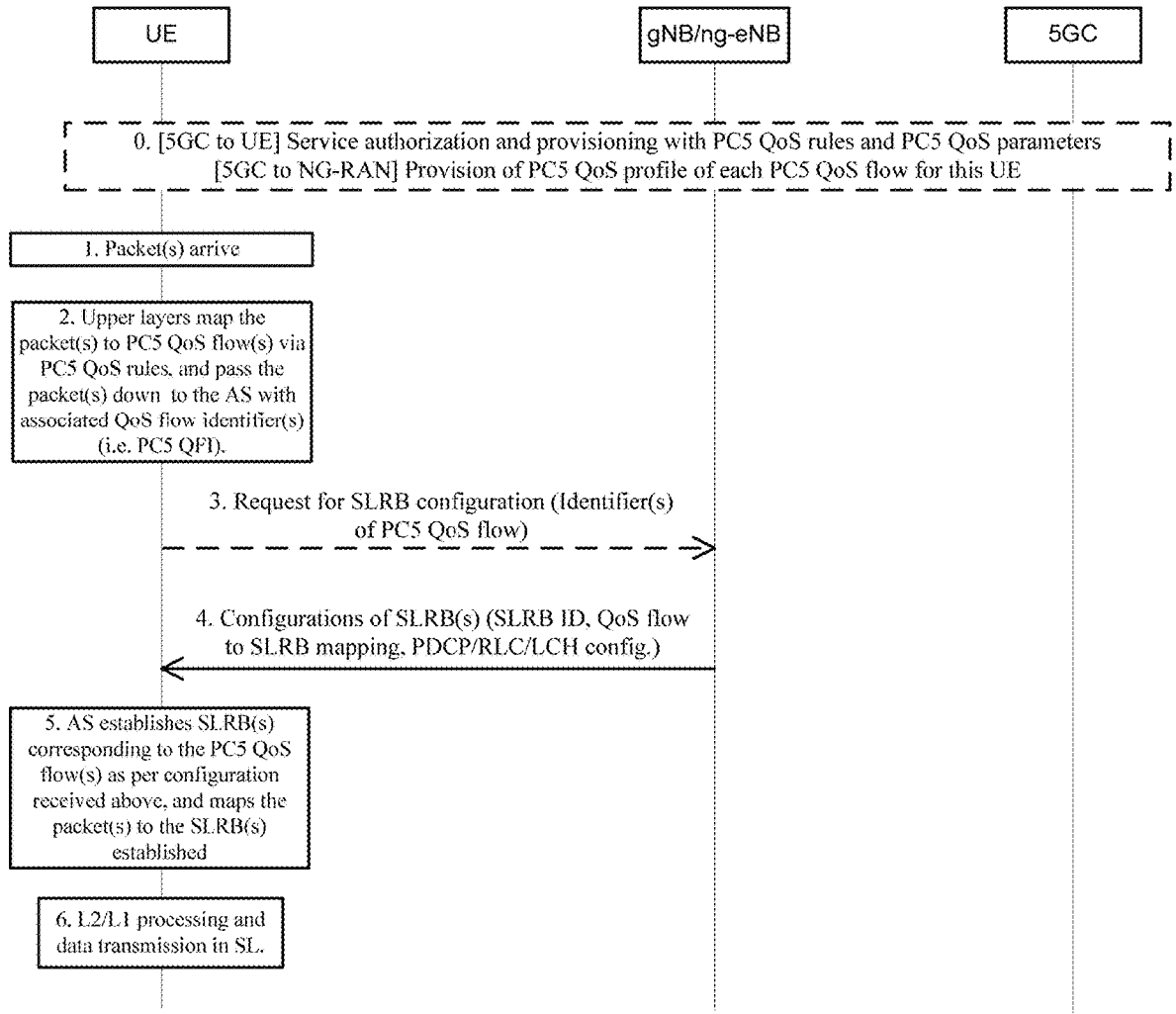
FIG. 6 is a reproduction of Figure A-2 of 3GPP R2-1900370.

Figure A-2 of 3GPP R2-1900370, entitled "PC5
QoS flow based, UE specific configuration", is
reproduced as FIG. 6

Option 2, as shown in Figure A-2, is to imitate the QoS flow based mechanism in NR Uu, because, as per Solution #19 in TR 23.786 [1], SA2 is also proposing, at least for QoS support SL unicast, to use the PC5 QoS flow based mechanism as follows [1]:
6.19.2.1.1 QoS Parameters Provision to UE and NG-RAN
The PC5 QoS parameters and PC5 QoS rule are provisioned to the UE as part of service authorization parameters using the solution defined for Key Issue #5. The PC5 QoS rule is used to map the V2X services (e.g. PSID or ITS-AIDS of the V2X application) to the PC5 QoS flow.
The PC5 QoS parameters are provisioned to the NG-RAN as part of The PC5 QoS parameters retrieved by the PCF from the UDR are provided to the NG-RAN via AMF. The AMF stores such information as part of the UE context. For subsequent procedures (e.g., Service request, Handover), the provision of the PC5 QoS parameters via N2 will follow the description as per clause 6.6.2.
Particularly, in Step 0 the PC5 QoS parameters and PC5 QoS rules for each PC5 QoS flow are provisioned to the UE in advance by service authorization and provisioning procedure as above SA2 conclusions; similarly, PC5 QoS profiles for each QoS flows are also given to the eNB/ng-eNB in advance in a provisioning way. Then, when packet(s) arrive, the UE can first derive the identifier of the associated PC5 QoS flow(s) based on the PC5 QoS rules configured in Step 0, and may then report these PC5 QFI(s) to the gNB/ng-eNB in Step 3. At the gNB/ng-eNB side, it can derive the QoS profile(s) of these reported PC5 QFI(s) based on the provisioning from 5GC in Step 0, and thus may signal the configurations of the SLRB(s) associated with the PC5 QFI(s) UE reported. In Step 5, the UE in the AS establishes SLRB(s) associated with the PC5 QFI(s) of the packet(s) as per gNB/ng-eNB configuration, and maps available packet(s) to the SLRB(s) established.
The biggest difference from Option 1 is that, with only QFI used as in NR Uu, the specific QoS parameters of each QoS flow may not be directly visible in the AS of the UE/RAN, so that the gNB/ng-eNB still needs to depend on the configuration from CN to know the specific QoS profile as in Uu (though the QoS profiles are provided in a provisioning way in advance)

Applicability:

This option, similar to Option 1, is only applicable to RRC_CONNECTED UEs.

RAN1 #95 meeting agreed to the following (as noted in the 3GPP RAN1 #95 Chairman's note):

It is supported to enable and disable SL HARQ feedback in unicast and groupcast.

FFS when HARQ feedback is enabled and disabled.

3GPP TS 36.321 states:

6.1.3.1a Sidelink BSR MAC Control Elements

Sidelink BSR and Truncated Sidelink BSR MAC control elements consist of one Destination Index field, one LCG ID field and one corresponding Buffer Size field per reported target group.

The Sidelink BSR MAC control elements are identified by MAC PDU subheaders with LCIDs as specified in table 6.2.1-2. They have variable sizes.

For each included group, the fields are defined as follows (FIGS. 6.1.3.1a-1 and 6.1.3.1a-2):

Destination Index: The Destination Index field identifies the ProSe Destination or the destination for V2X sidelink communication. The length of this field is 4 bits. The value is set to the index of the destination reported in destinationInfoList for sidelink communication or is set to one index among index(es) associated to same destination reported in v2x-DestinationInfoList for V2X sidelink communication. If multiple such lists are reported, the value is indexed sequentially across all the lists in the same order as specified in [8];

LCG ID: The Logical Channel Group ID field identifies the group of logical channel(s) which buffer status is being reported. The length of the field is 2 bits;

Buffer Size: The Buffer Size field identifies the total amount of data available across all logical channels of a LCG of a ProSe Destination after all MAC PDUs for the TTI have been built. The amount of data is indicated in number of bytes. It shall include all data that is available for transmission in the RLC layer and in the PDCP layer; the definition of what data shall be considered as available for transmission is specified in [3] and [4] respectively. The size of the RLC and MAC headers are not considered in the buffer size computation. The length of this field is 6 bits. The values taken by the Buffer Size field are shown in Table 6.1.3.1-1;

R: Reserved bit, set to "0".

Buffer Sizes of LCGs are included in decreasing order of the highest priority of the sidelink logical channel belonging to the LCG irrespective of the value of the Destination Index field.

[FIG. 6.1.3.1a-1 of 3GPP TS 36.321 V15.3.0, entitled "Sidelink BSR and Truncated Sidelink BSR MAC control element for even N", is reproduced as FIG. 7]

[FIG. 6.1.3.1a-2 of 3GPP TS 36.321 V15.3.0, entitled "Sidelink BSR and Truncated Sidelink BSR MAC control element for odd N", is reproduced as FIG. 8]

6.2.1 MAC Header for DL-SCH, UL-SCH and MCH

The MAC header is of variable size and consists of the following fields:

LCID: The Logical Channel ID field identifies the logical channel instance of the corresponding MAC SDU or the type of the corresponding MAC control element or padding as described in tables 6.2.1-1, 6.2.1-2 and 6.2.1-4 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. If the LCID field is set to "10000", an additional octet is present in the MAC PDU subheader containing the eLCID field and this additional octet follows the octet containing LCID field. A UE of Category 0 [12] except when in enhanced coverage, and unicastFreqHoppingInd-r13 is indicated in the BR version of SI message carrying SystemInformationBlockType2, and UE supports frequency hopping for unicast [12] shall indicate CCCH using LCID "01011", a BL UE with support for frequency hopping for unicast [12] and a UE in enhanced coverage with support for frequency hopping for unicast [12] shall if unicastFreqHoppingInd-r13 is indicated in the BR version of SI message carrying SystemInformationBlockType2 indicate CCCH using LCID "01100", otherwise the UE shall indicate CCCH using LCID "00000". The LCID field size is 5 bits;

eLCID: The extended Logical Channel ID field identifies the logical channel instance of the corresponding MAC SDU or the type of the corresponding MAC control element as described in tables 6.2.1-1a and 6.2.1-2a for the DL-SCH and UL-SCH respectively. The size of the eLCID field is 6 bits.

L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field and F2 field;

F: The Format field indicates the size of the Length field as indicated in table 6.2.1-3. There is one F field per MAC PDU subheader except for the last subheader and subheaders corresponding to fixed-sized MAC control elements and except for when F2 is set to 1. The size of the F field is 1 bit. If the F field is included; if the size of the MAC SDU or variable-sized MAC control element is less than 128 bytes, the value of the F field is set to 0, otherwise it is set to 1;

F2: The Format2 field indicates the size of the Length field as indicated in table 6.2.1-3. There is one F2 field per MAC PDU subheader. The size of the F2 field is 1 bit. If the size of the MAC SDU or variable-sized MAC control element is larger than 32767 bytes, and if the corresponding subheader is not the last subheader, the value of the F2 field is set to 1, otherwise it is set to 0.

E: The Extension field is a flag indicating if more fields are present in the MAC header or not. The E field is set to "1" to indicate another set of at least R/F2/E/LCID fields. The E field is set to "0" to indicate that either a MAC SDU, a MAC control element or padding starts at the next byte;

R: Reserved bit, set to "0".

The MAC header and subheaders are octet aligned.

[Table 6.2.1-1 of 3GPP TS 36.321 V15.3.0, entitled "Values of LCID for DL-SCH", is reproduced as FIG. 9]

[Table 6.2.1-1a of 3GPP TS 36.321 V15.3.0, entitled "Values of eLCID for DL-SCH", is reproduced as FIG. 10]

For NB-IoT only the following LCID values for DL-SCH are applicable: CCCH, Identity of the logical channel, SC-PTM Stop Indication, SC-MCCH/SC-MTCH, UE Contention Resolution Identity, Timing Advance Command, DRX Command and Padding.

[Table 6.2.1-2 of 3GPP TS 36.321 V15.3.0, entitled "Values of LCID for UL-SCH", is reproduced as FIG. 11]

3GPP TS 38.321 states:

6.1.2 MAC PDU (DL-SCH and UL-SCH Except Transparent MAC and Random Access Response)

A MAC PDU consists of one or more MAC subPDUs. Each MAC subPDU consists of one of the following:

- A MAC subheader only (including padding);
- A MAC subheader and a MAC SDU;
- A MAC subheader and a MAC CE;
- A MAC subheader and padding.

The MAC SDUs are of variable sizes.

Each MAC subheader corresponds to either a MAC SDU, a MAC CE, or padding.

A MAC subheader except for fixed sized MAC CE, padding, and a MAC SDU containing UL CCCH consists of the four header fields R/F/LCID/L. A MAC subheader for fixed sized MAC CE, padding, and a MAC SDU containing UL CCCH consists of the two header fields R/LCID.

Figure 12:
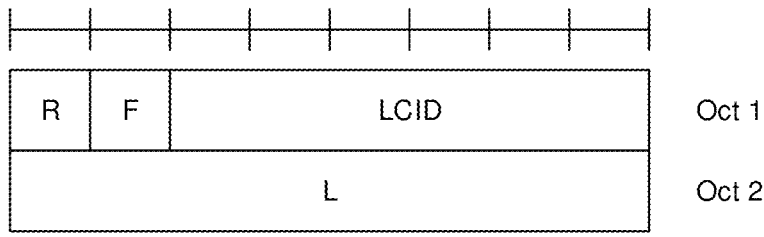
FIG. 12 is a reproduction of FIG. 6.1.2-1 of 3GPP TS 38.321 V15.5.0.

[FIG. 6.1.2-1 of 3GPP TS 38.321 V15.5.0, entitled "R/F/LCID/L MAC subheader with 8-bit L field", is reproduced as FIG. 12]

Figure 13:
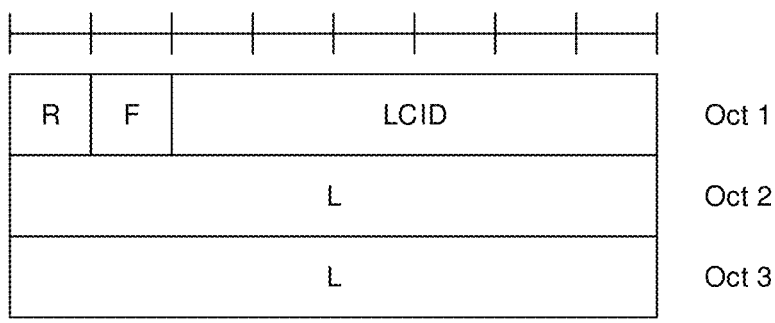
FIG. 13 is a reproduction of FIG. 6.1.2-2 of 3GPP TS 38.321 V15.5.0.

[FIG. 6.1.2-2 of 3GPP TS 38.321 V15.5.0, entitled "R/F/LCID/L MAC subheader with 16-bit L field", is reproduced as FIG. 13]

Figure 14:
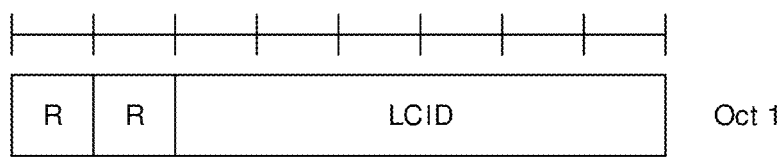
FIG. 14 is a reproduction of FIG. 6.1.2-3 of 3GPP TS 38.321 V15.5.0.

[FIG. 6.1.2-3 of 3GPP TS 38.321 V15.5.0, entitled "R/LCID MAC subheader", is reproduced as FIG. 14]

MAC CEs are placed together. DL MAC subPDU(s) with MAC CE(s) is placed before any MAC subPDU with MAC SDU and MAC subPDU with padding as depicted in FIG. 6.1.2-4. UL MAC subPDU(s) with MAC CE(s) is placed after all the MAC subPDU(s) with MAC SDU and before the MAC subPDU with padding in the MAC PDU as depicted in FIG. 6.1.2-5. The size of padding can be zero.

Figure 15:
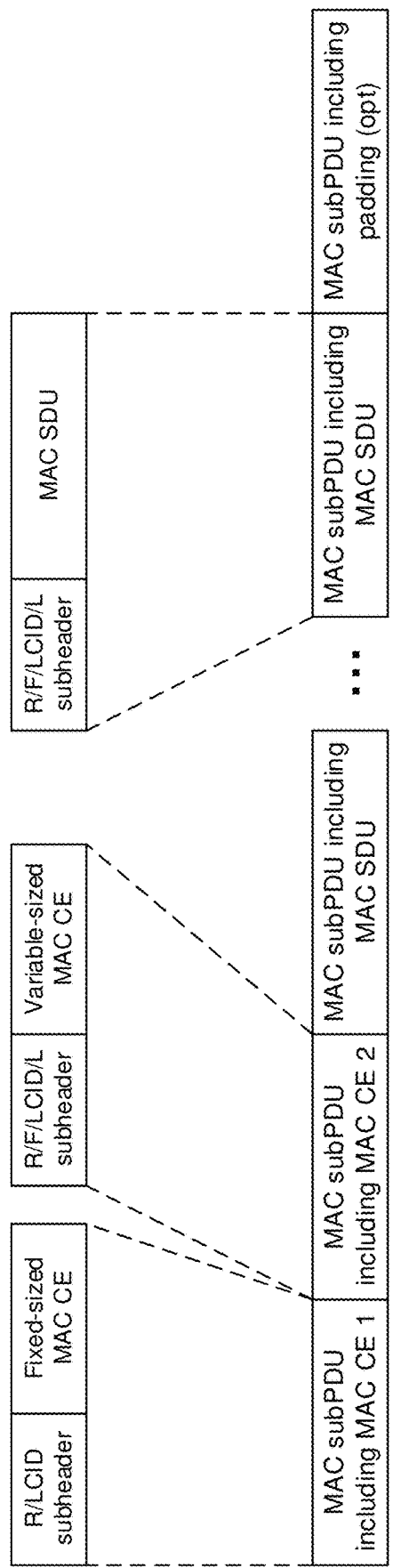
FIG. 15 is a reproduction of FIG. 6.1.2-4 of 3GPP TS 38.321 V15.5.0.

[FIG. 6.1.2-4 of 3GPP TS 38.321 V15.5.0, entitled "Example of a DL MAC PDU", is reproduced as FIG. 15]

Figure 16:
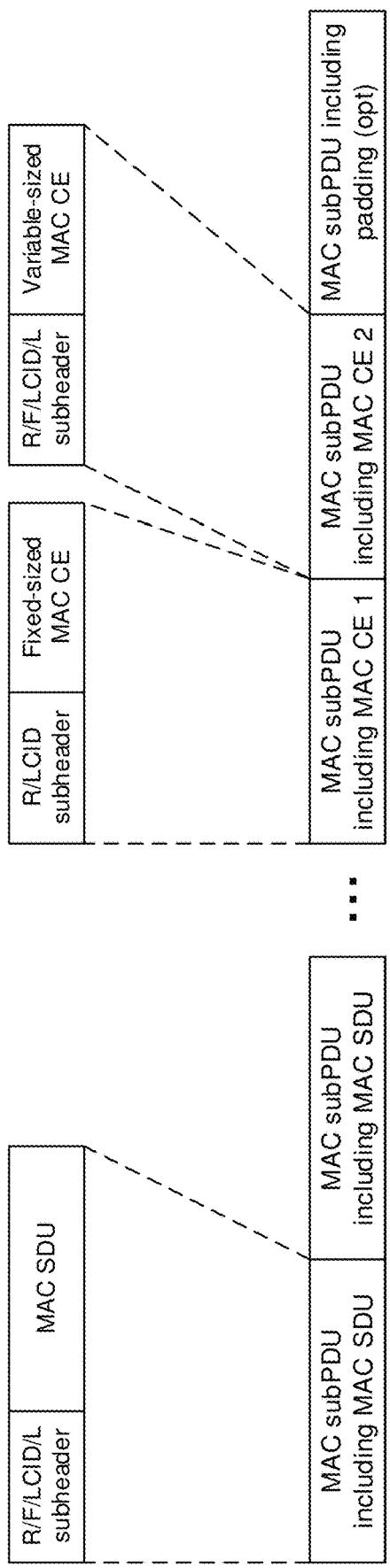
FIG. 16 is a reproduction of FIG. 6.1.2-5 of 3GPP TS 38.321 V15.5.0.

[FIG. 6.1.2-5 of 3GPP TS 38.321 V15.5.0, entitled "Example of a UL MAC PDU", is reproduced as FIG. 16]

[ . . . ]

6.2.1 MAC Subheader for DL-SCH and UL-SCH

The MAC subheader consists of the following fields:

- LCID: The Logical Channel ID field identifies the logical channel instance of the corresponding MAC SDU or the type of the corresponding MAC CE or padding as described in Tables 6.2.1-1 and 6.2.1-2 for the DL-SCH and UL-SCH respectively. There is one LCID field per MAC subheader. The LCID field size is 6 bits;
- L: The Length field indicates the length of the corresponding MAC SDU or variable-sized MAC CE in bytes. There is one L field per MAC subheader except for subheaders corresponding to fixed-sized MAC CEs, padding, and MAC SDUs containing UL CCCH. The size of the L field is indicated by the F field;
- F: The Format field indicates the size of the Length field. There is one F field per MAC subheader except for subheaders corresponding to fixed-sized MAC CEs, padding, and MAC SDUs containing UL CCCH. The size of the F field is 1 bit. The value 0 indicates 8 bits of the Length field. The value 1 indicates 16 bits of the Length field;
- R: Reserved bit, set to 0.

The MAC subheader is octet aligned.

[Table 6.2.1-1 of 3GPP TS 38.321 V15.5.0, entitled "Values of LCID for DL-SCH", is reproduced as FIG. 17]

[Table 6.2.1-2 of 3GPP TS 38.321 V15.5.0, entitled "Values of LCID for UL-SCH", is reproduced as FIG. 18]

According to RAN1 meeting report (as described in the 3GPP RAN1 #95 Chairman's note), NR (New RAT/Radio) SL (Sidelink) will support HARQ (Hybrid Automatic Repeat Request) feedback for SL unicast and groupcast. HARQ feedback mechanism can enhance transmission reliability. If a receiving UE cannot successfully decode a packet received from a transmitting UE, the receiving UE responses a NACK of the packet to the transmitting UE so that the transmitting UE will retransmit the packet again.

As discussed in 3GPP R2-1900370, NW-configured SLRB (Sidelink Radio Bearer) configuration for PC5 QoS (Quality of Service) flow based QoS model was introduced. The SLRB configuration may include SLRB ID(s), QoS flow-to-SLRB mapping, and AS configuration (e.g. PDCP (Packet Data Convergence Protocol/RLC (Radio Link Control)/LCH (Logical Channel) configurations). To request the SLRB configuration, the UE needs to provide a PQI (QC5 5QI) for a PC5 QoS flow to the gNB. If the PQI requires higher reliability and can tolerate longer latency, the gNB may enable HARQ feedback on a SLRB or logical channel used to serve the PC5 QoS flow. When scheduling a SL grant to the transmitting UE, the gNB may indicate HARQ feedback resource to the transmitting UE if the SL grant is used to transmit packets that require higher reliability.

According to the LTE V2X, SL BSR is reported per LCG within a destination. If NR SL follows LTE SL, the gNB cannot know whether data in a LCG is from a SL LCH with HARQ feedback mode being enabled or not and thus cannot schedule SL grant properly. As a result, the HARQ feedback resource would be wasted if the gNB configures a SL grant to a UE while the HARQ feedback mode associated with the SL data in the UE is disabled. Alternatives to improve HARQ feedback resource efficiency should be considered.

Figure 19A:
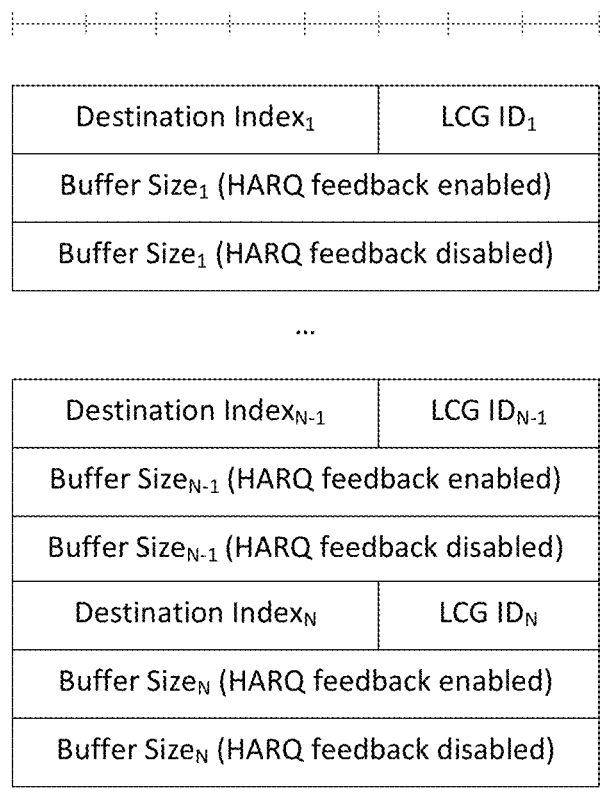
FIGS. 19A and 19B are examples of a SL BSR format according to one exemplary embodiment.
Figure 19B:
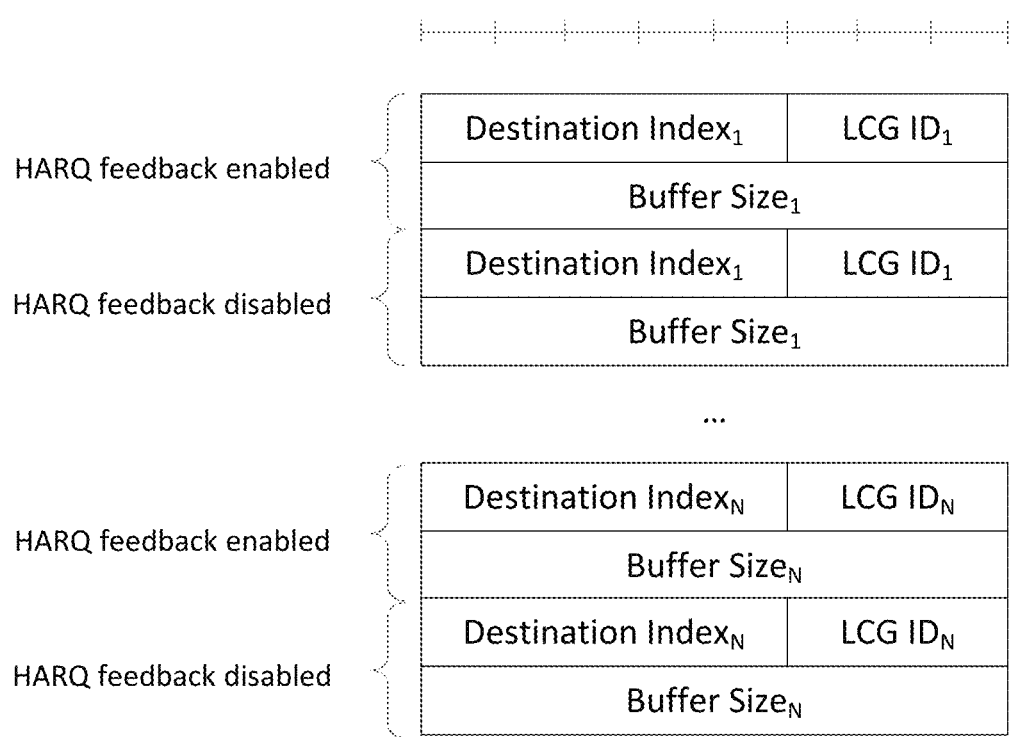

In one alternative, SL LCHs associated with different HARQ feedback modes may be mapped to the same LCG. This alternative is to separate buffer sizes associated with different HARQ feedback modes under a LCG in a SL BSR (i.e. the format of a SL BSR includes at least one field of buffer size associated with HARQ feedback mode being enabled and one field of buffer size associated with HARQ feedback mode being disabled). FIGS. 19A and 19B illustrate examples of SL BSR format for this alternative.

In the first case as shown in FIG. 19A, the buffer size associated with HARQ feedback mode being enabled under a LCG and the buffer size associated with HARQ feedback mode being disabled under the LCG should be present simultaneously. Otherwise, the gNB cannot distinguish the HARQ feedback mode is enabled or disabled if only one buffer size is present under the LCG. This situation also occurs on the second case as shown in FIG. 19B. The set of Destination Index, LCG ID and Buffer Size for SL LCHs with HARQ feedback mode being enabled and the set of Destination Index, LCG ID and Buffer Size for SL LCHs with HARQ feedback mode being disabled should be present at the same time. Therefore, the above alternative may cause signalling overhead if there is the case that either SL LCHs with HARQ feedback enabled or SL LCHs with HARQ feedback disabled has data available for transmission. In this situation, it is possible to include an extra field in the SL BSR for indicating the HARQ feedback mode associated with at least one buffer size field. It is also feasible to include one extra field per buffer size field. By this way, either one buffer size could be present alone.

In another alternative, the gNB can categorize LCGs (Logical Channel Groups) into two sets of LCGs: one set is associated with HARQ feedback being enabled, and the other set is associated with HARQ feedback being disabled.

Figure 20:
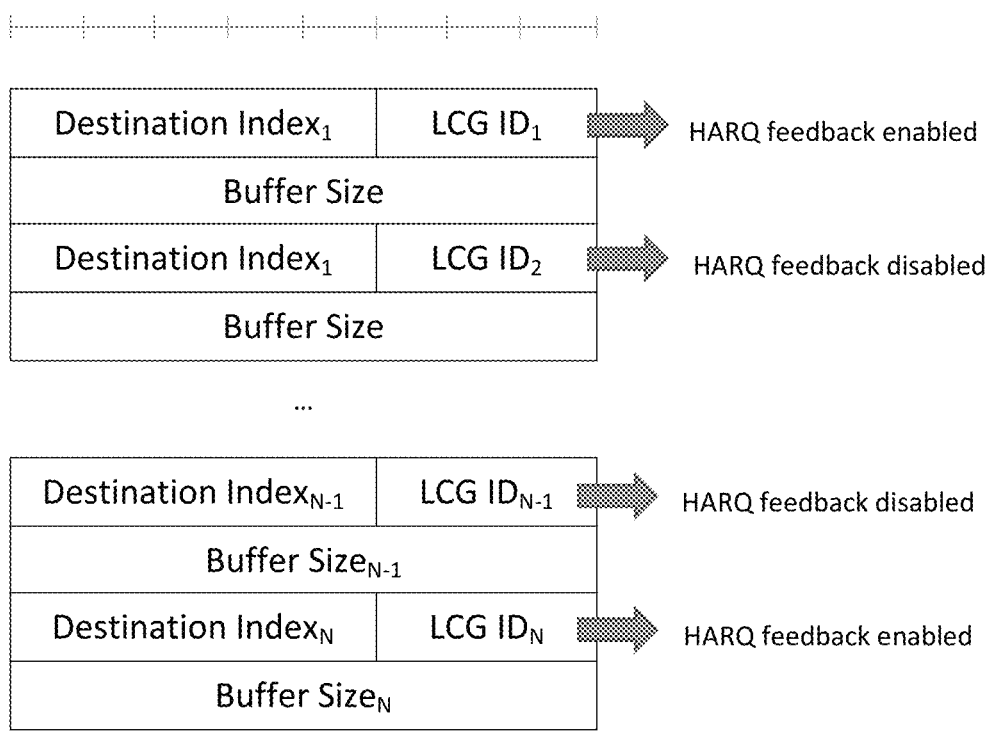
FIG. 20 is an example of a SL BSR format according to one exemplary embodiment.

The gNB can then map a SL LCH to a LCG according to at least the HARQ feedback mode associated with the SL LCH. With this LCG categorization, the gNB can know whether a buffer size in the SL BSR is associated with a HARQ feedback mode being disabled or enabled according to the LCG ID. In this solution, SL LCHs associated with different HARQ feedback modes cannot be mapped to the same LCG ID. FIG. 20 illustrates examples of SL BSR format for this alternative.

Although the second alternative can reduce signalling overhead in the first alternative, the second alternative may consume more LCG ID (Identity) space.

Figure 21:
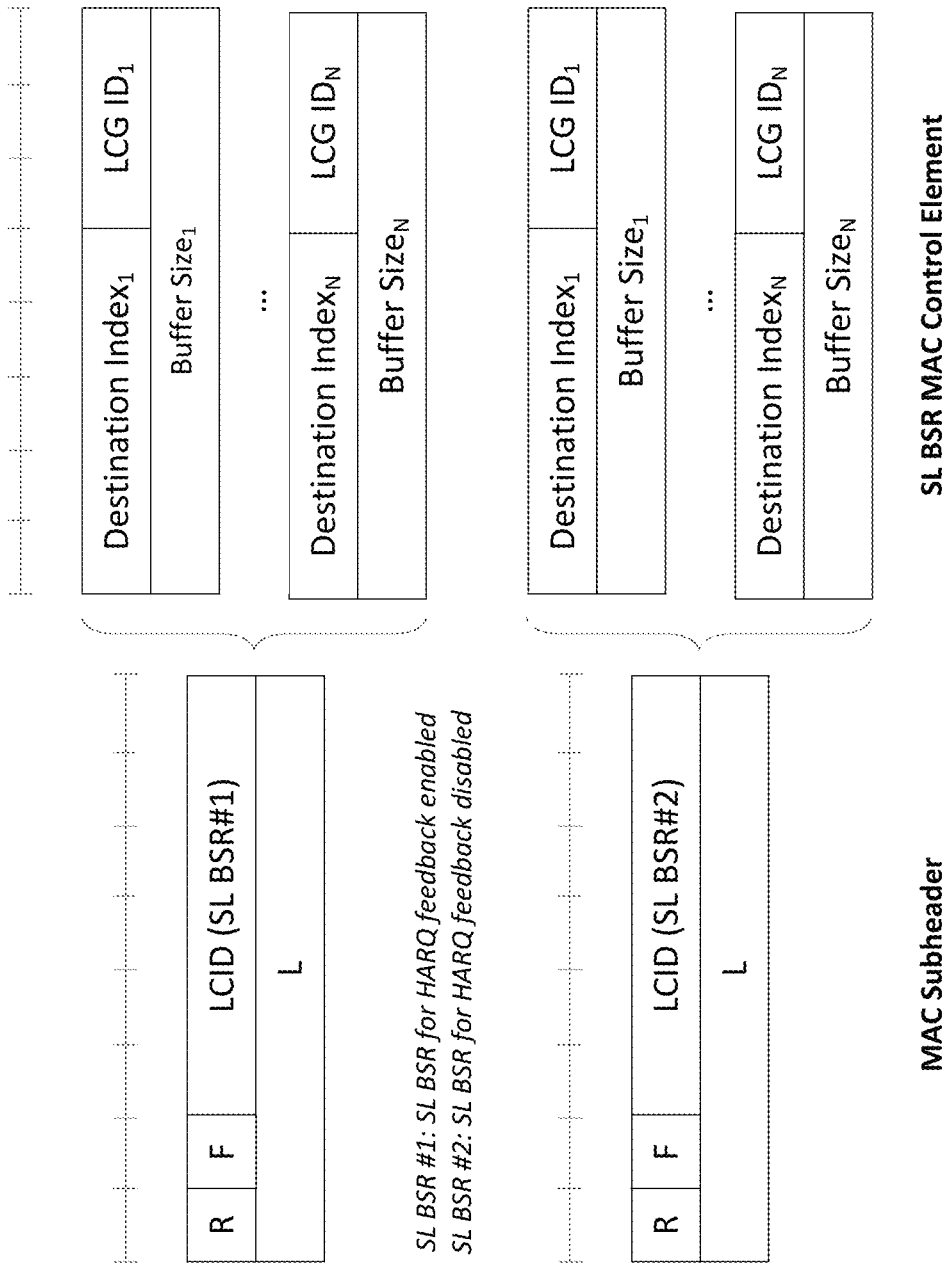
FIG. 21 is an example of a LCID (Logical Channel Identity) usage for SL BSR format according to one exemplary embodiment.

In another alternative, there are two separate SL BSRs, a first SL BSR is specific to indicate buffer status for SL LCHs with HARQ feedback mode being enabled and a second SL BSR is specific to indicate buffer status for SL LCHs with HARQ feedback mode being disabled. The first SL BSR and the second SL BSR could use different LCIDs (in MAC Subheader). This alternative is illustrated in FIG. 21. However, this alternative may consume LCID (Logical Channel Identity) space.

Figure 22:
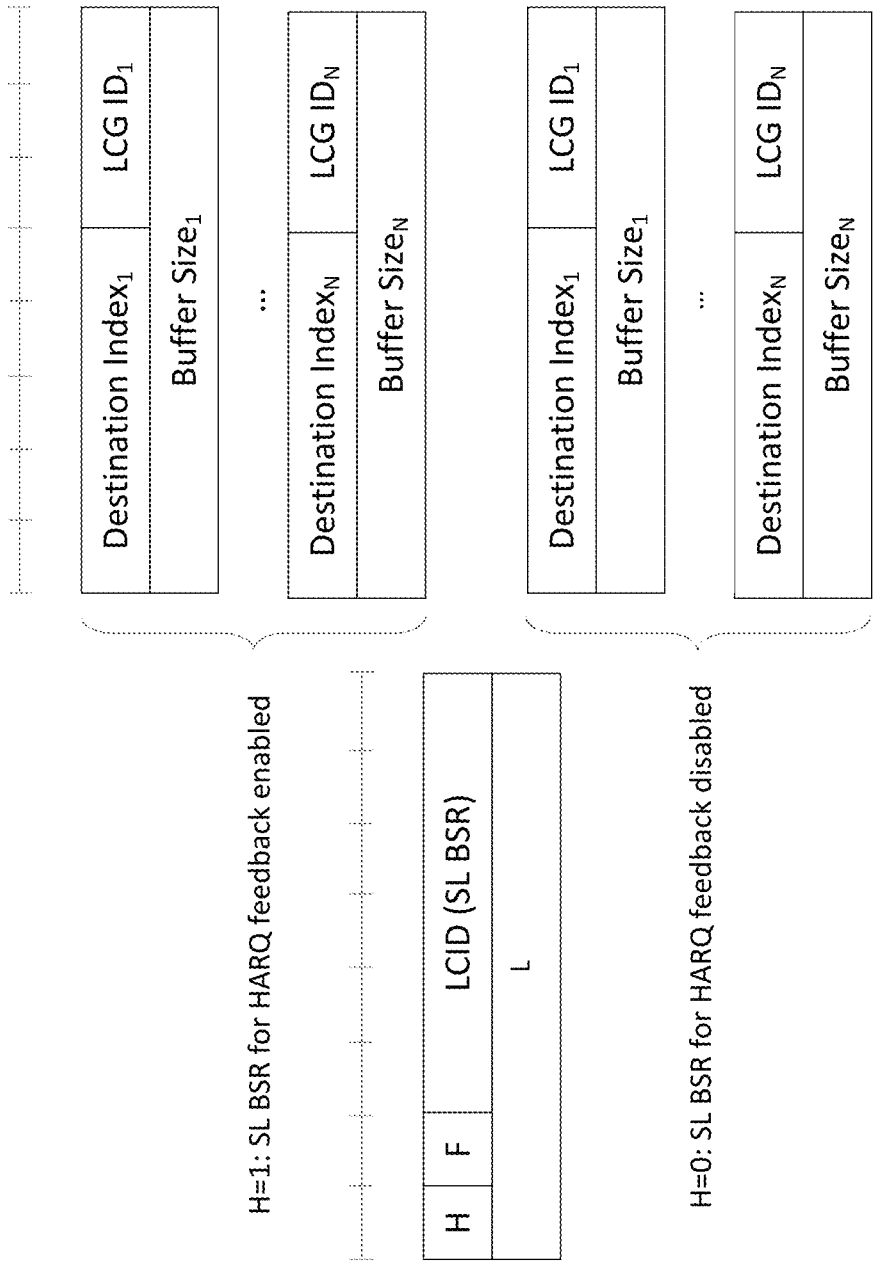
FIG. 22 is an example of a MAC (Medium Access Control) subheader format for SL BSR according to one exemplary embodiment.

In another alternative, one of reserved bits in the current MAC (Medium Access Control) subheader for a SL BSR can be used to indicate whether HARQ feedback mode of SL LCHs of buffer status indicated in the SL BSR is enabled or not. Compared to above alternative, this alternative does not consume additional LCID in order to interpret different SL BSRs for different HARQ feedback modes. FIG. 22 illustrates examples of MAC subheader format for SL BSR.

Figure 23:
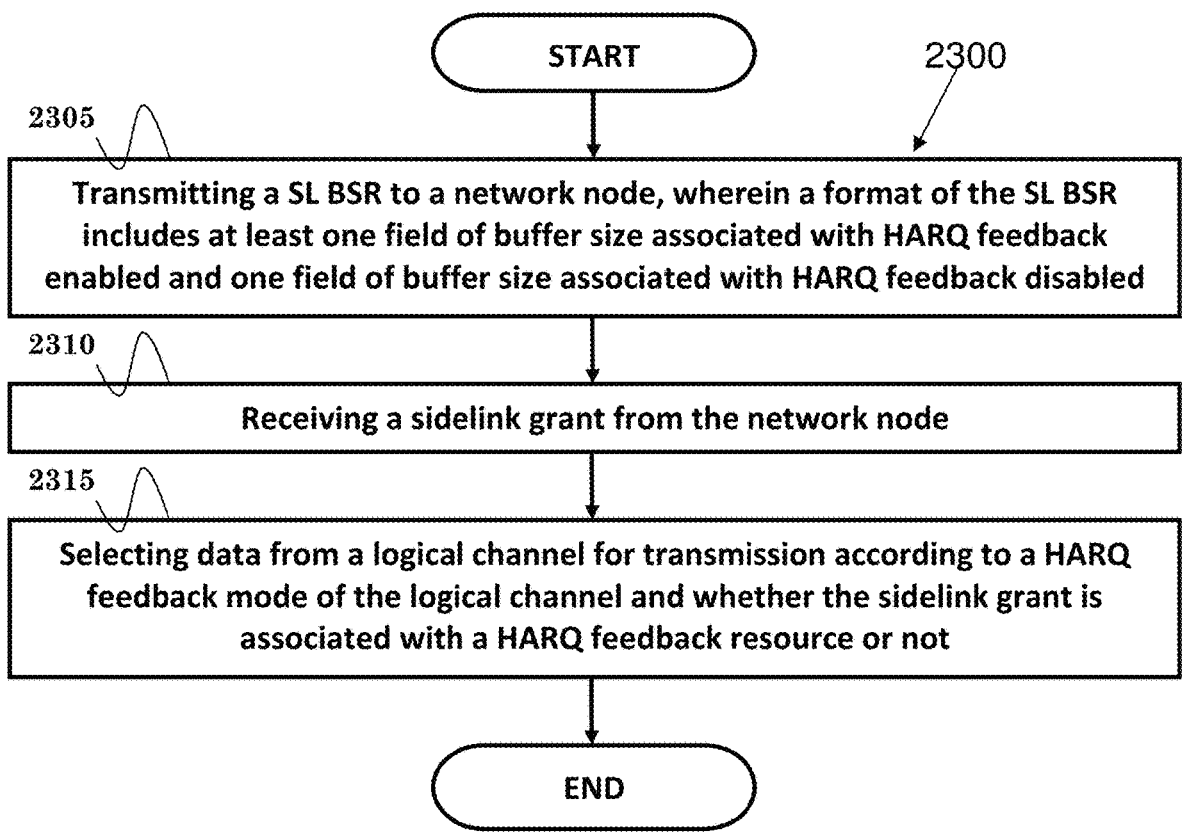
FIG. 23 is a flow chart according to one exemplary embodiment.

FIG. 23 is a flow chart 2300 according to one exemplary embodiment from the perspective of a UE to handle a sidelink buffer status report (SL BSR). In step 2305, the UE transmits a SL BSR to a network node, wherein a format of the SL BSR includes at least one field of buffer size associated with HARQ feedback enabled and one field of buffer size associated with HARQ feedback disabled. In step 2310, the UE receives a sidelink grant from the network node. In step 2315, the UE selects data from a logical channel for transmission according to a HARQ feedback mode of the logical channel and whether the sidelink grant is associated with a HARQ feedback resource or not.

In one embodiment, the data from the logical channel associated with HARQ feedback enabled could be selected if the sidelink grant is associated with a HARQ feedback resource. Alternatively, the data from the logical channel associated with HARQ feedback disabled could be selected if the sidelink grant is not associated with a HARQ feedback resource.

In one embodiment, the UE could receive a SLRB configuration from the network node, wherein the SLRB configuration configures the UE with a first logical channel associated with HARQ feedback enabled and a second logical channel associated with HARQ feedback disabled.

In one embodiment, the network node could be a base station (e.g. gNB).

Referring back to FIGS. 3 and 4, in one exemplary embodiment of a UE, the device 300 includes a program code 312 stored in the memory 310. The CPU 308 could execute program code 312 to enable the UE (i) to transmit a SL BSR to a network node, wherein a format of the SL BSR includes at least one field of buffer size associated with HARQ feedback enabled and one field of buffer size associated with HARQ feedback disabled, (ii) to receive a sidelink grant from the network node, and (iii) to select data from a logical channel for transmission according to a HARQ feedback mode of the logical channel and whether the sidelink grant is associated with a HARQ feedback resource or not. Furthermore, the CPU 308 can execute the program code 312 to perform all of the above-described actions and steps or others described herein.

Figure 24:
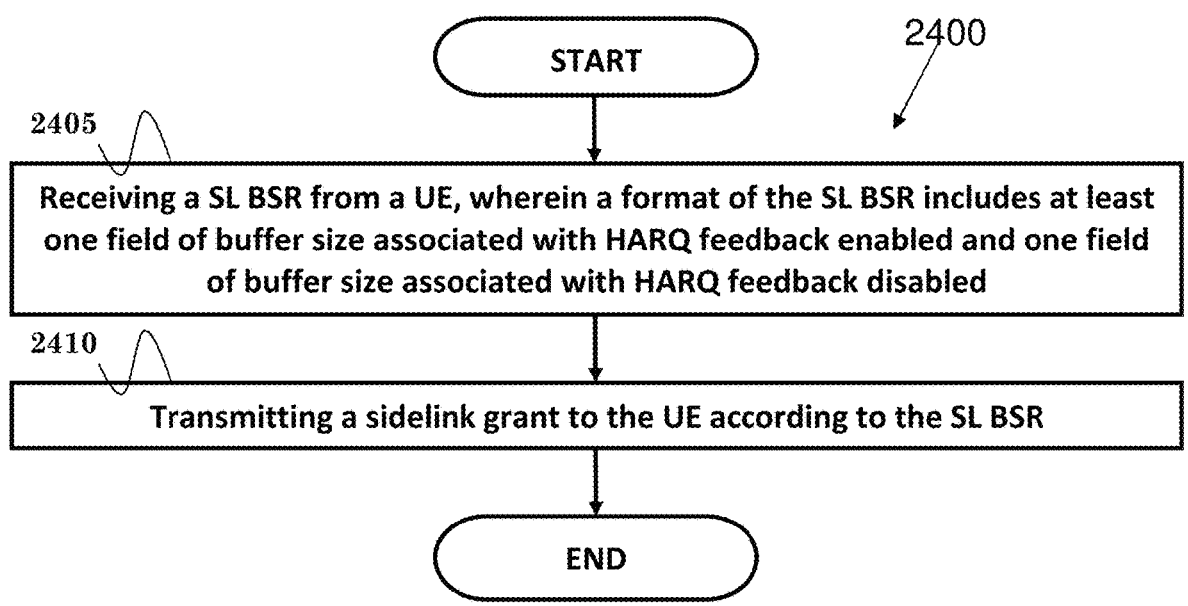
FIG. 24 is a flow chart according to one exemplary embodiment.

FIG. 24 is a flow chart 2400 according to one exemplary embodiment from the perspective of a network node to handle a SL BSR. In step 2405, the network node receives a SL BSR from a UE, wherein a format of the SL BSR includes at least one field of buffer size associated with HARQ feedback enabled and one field of buffer size associated with HARQ feedback disabled. In step 2410, the network node transmits a sidelink grant to the UE according to the SL BSR.

In one embodiment, whether the sidelink grant is associated with a HARQ feedback resource or not depends on content in the SL BSR. The network node could transmits a SLRB configuration to the UE, wherein the SLRB configuration configures the UE with a first logical channel associated with HARQ feedback enabled and a second logical channel associated with HARQ feedback disabled. The network node could also transmit a first sidelink grant associated with the HARQ feedback resource to the UE if the buffer size associated with HARQ feedback enabled in the SL BSR is not empty. Furthermore, the network node could transmit a second sidelink grant not associated with the HARQ feedback resource to the UE if the buffer size associated with HARQ feedback disabled in the SL BSR is not empty.

In one embodiment, the SLRB configuration may configure the UE to map the first logical channel and the second logical channel to a LCG. The field of buffer size associated with HARQ feedback enabled could identify total amount of data available across all logical channels associated with HARQ feedback enabled of the LCG, and all logical channels include the first logical channel and do not include the second logical channel. The field of buffer size associated with HARQ feedback disabled could also identify the total amount of data available across all logical channels associated with HARQ feedback disabled of the LCG, and all logical channels include the second logical channel and do not include the first logical channel.

In one embodiment, the sidelink grant may include frequency domain information of the HARQ feedback resource if the sidelink grant is associated with the HARQ feedback resource. The sidelink grant may also include time domain information of the HARQ feedback resource if the sidelink grant is associated with the HARQ feedback resource.

Alternatively, the sidelink grant may not include frequency domain information of the HARQ feedback resource if the sidelink grant is not associated with the HARQ feedback resource. Furthermore, the sidelink grant may not include time domain information of the HARQ feedback resource if the sidelink grant is not associated with the HARQ feedback resource.

In one embodiment, the sidelink transmission could further include data from a logical channel with HARQ feedback disabled if the sidelink grant is associated with the HARQ feedback resource. The sidelink transmission may not include data from a logical channel with HARQ feedback enabled if the sidelink grant is not associated with the HARQ feedback resource.

In one embodiment, the network node could be a base station (e.g. gNB). There may be a field in the SL BSR used to indicate a HARQ feedback mode of at least one field of buffer size.

Referring back to FIGS. 3 and 4, in one exemplary embodiment of a network node, the device 300 includes a program code 312 stored in the memory 310. The CPU 308 could execute program code 312 to enable the network node (i) to receive a SL BSR from a UE, wherein a format of the SL BSR includes at least one field of buffer size associated with HARQ feedback enabled and one field of buffer size associated with HARQ feedback disabled, and (ii) to transmit a sidelink grant to the UE according to the SL BSR. Furthermore, the CPU 308 can execute the program code 312 to perform all of the above-described actions and steps or others described herein.

Figure 25:
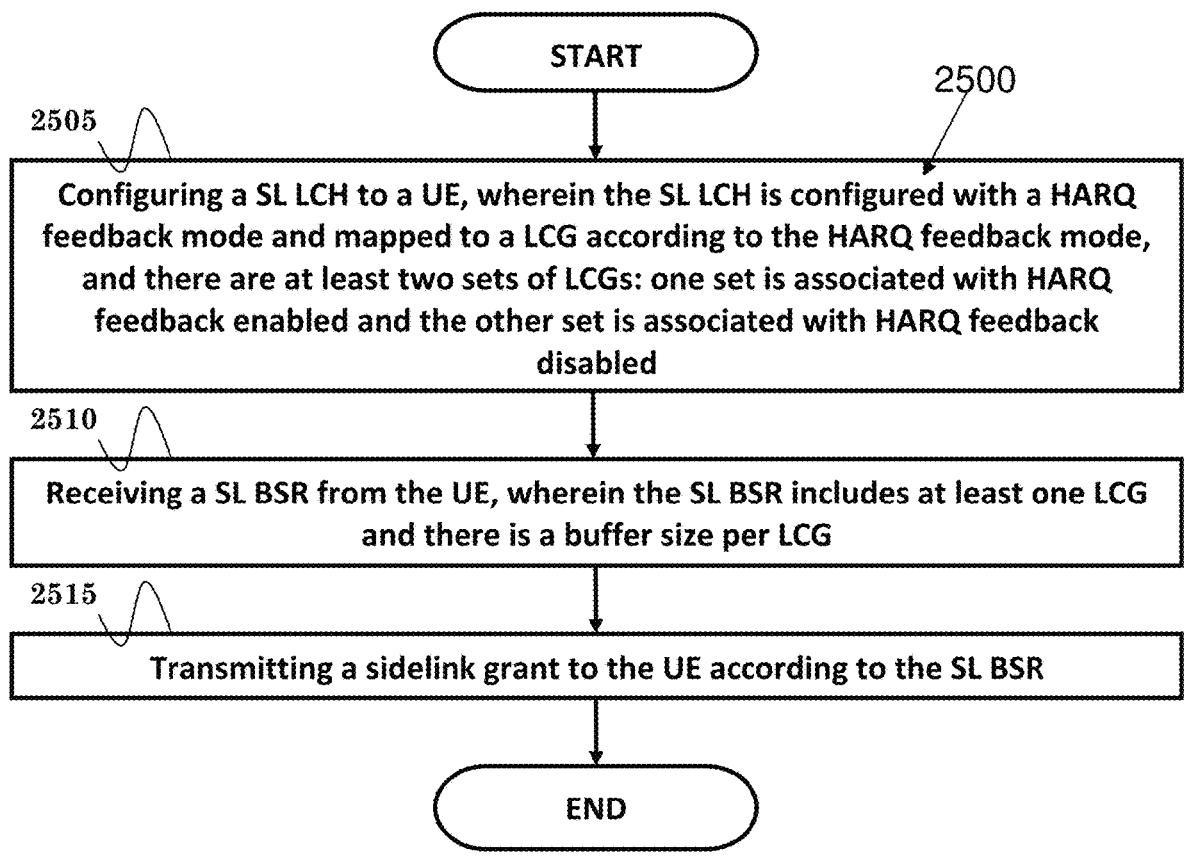
FIG. 25 is a flow chart according to one exemplary embodiment.

FIG. 25 is a flow chart 2500 according to one exemplary embodiment from the perspective of a network node to handle a SL BSR. In step 2505, the network node configures a sidelink logical channel (SL LCH) to a UE, wherein the SL LCH is configured with a HARQ feedback mode and mapped to a LCG according to the HARQ feedback mode, and there are at least two sets of LCGs: one set is associated with HARQ feedback enabled and the other set is associated with HARQ feedback disabled. In step 2510, the network node receives a SL BSR from the UE, wherein the SL BSR includes at least one LCG and there is a buffer size per LCG. In step 2515, the network node transmits a sidelink grant to the UE according to the SL BSR.

In one embodiment, whether the sidelink grant is associated with a HARQ feedback resource or not depends on content in the SL BSR.

In one embodiment, the network node could transmit a SLRB configuration to the UE, wherein the SLRB configuration configures the UE with a first logical channel associated with HARQ feedback enabled and a second logical channel associated with HARQ feedback disabled. The SLRB configuration may configure the UE to map the first logical channel to a first LCG and map the second logical channel to a second LCG.

In one embodiment, the network node could transmit a first sidelink grant associated with the HARQ feedback resource to the UE if the buffer size of the first LCG in the SL BSR is not empty. The network node could also transmit a second sidelink grant not associated with the HARQ feedback resource to the UE if the buffer size of the second LCG in the SL BSR is not empty.

In one embodiment, the field of buffer size of the first LCG may identify the total amount of data available across all logical channels associated with HARQ feedback enabled of the first LCG, and the all logical channels include the first logical channel and do not include the second logical channel. Furthermore, the field of buffer size of the second LCG may identify the total amount of data available across all logical channels associated with HARQ feedback disabled of the second LCG, and the all logical channels include the second logical channel and do not include the first logical channel.

In one embodiment, the sidelink grant may include frequency domain information of the HARQ feedback resource if the sidelink grant is associated with the HARQ feedback resource. The sidelink grant may also include time domain information of the HARQ feedback resource if the sidelink grant is associated with the HARQ feedback resource.

Alternatively, the sidelink grant may not include frequency domain information of the HARQ feedback resource if the sidelink grant is not associated with the HARQ feedback resource. Furthermore, the sidelink grant may not include time domain information of the HARQ feedback resource if the sidelink grant is not associated with the HARQ feedback resource.

In one embodiment, the sidelink transmission may further include data from a logical channel with HARQ feedback disabled if the sidelink grant is associated with the HARQ feedback resource. In addition, the sidelink transmission may not include data from a logical channel with HARQ feedback enabled if the sidelink grant is not associated with the HARQ feedback resource.

In one embodiment, the network node could be a base station (e.g. gNB).

Referring back to FIGS. 3 and 4, in one exemplary embodiment of a first UE, the device 300 includes a program code 312 stored in the memory 310. The CPU 308 could execute program code 312 to enable the first UE (i) to configure a SL LCH to a UE, wherein the SL LCH is configured with a HARQ feedback mode and mapped to a LCG according to the HARQ feedback mode, and there are at least two sets of LCGs: one set is associated with HARQ feedback enabled and the other set is associated with HARQ feedback disabled, (ii) to receive a SL BSR from the UE, wherein the SL BSR includes at least one LCG and there is a buffer size per LCG, and (iii) to transmit a sidelink grant to the UE according to the SL BSR. Furthermore, the CPU 308 can execute the program code 312 to perform all of the above-described actions and steps or others described herein.

Figure 26:
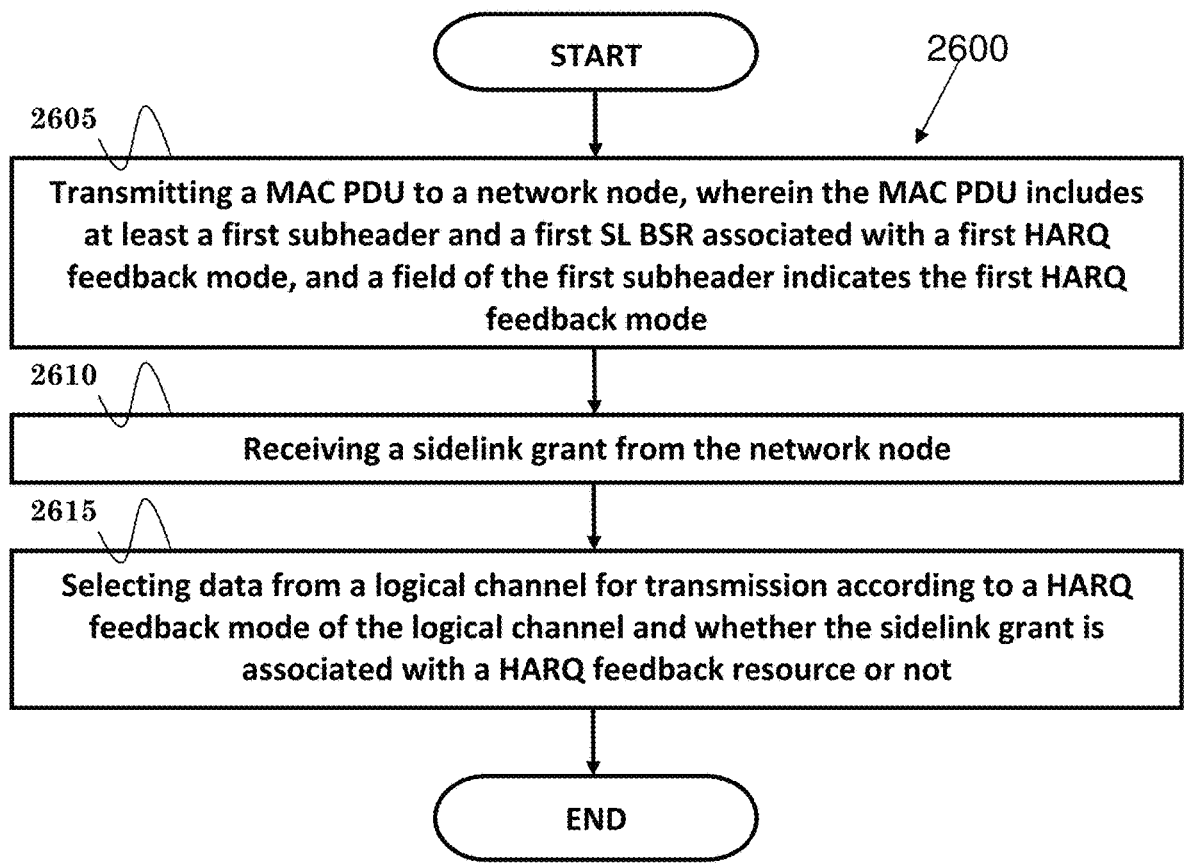
FIG. 26 is a flow chart according to one exemplary embodiment.

FIG. 26 is a flow chart 2600 according to one exemplary embodiment from the perspective of a UE to handle a SL BSR. In step 2605, the UE transmits a MAC PDU to a network node, wherein the MAC PDU includes at least a first subheader and a first SL BSR associated with a first HARQ feedback mode, and a field of the first subheader indicates the first HARQ feedback mode. In step 2610, the UE receives a sidelink grant from the network node. In step 2615, the UE selects data from a logical channel for transmission according to a HARQ feedback mode of the logical channel and whether the sidelink grant is associated with a HARQ feedback resource or not.

In one embodiment, the data from the logical channel associated with HARQ feedback enabled may be selected if the sidelink grant is associated with a HARQ feedback resource. Alternatively, the data from the logical channel associated with HARQ feedback disabled may be selected if the sidelink grant is not associated with a HARQ feedback resource.

In one embodiment, the UE could receive a SLRB configuration from the network node, wherein the SLRB configuration configures the UE with a first logical channel associated with HARQ feedback enabled and a second logical channel associated with HARQ feedback disabled. The MAC PDU could further include a second subheader and a second SL BSR associated with a second HARQ feedback mode which is different from the first HARQ feedback mode, and a field of the second subheader indicates the second HARQ feedback mode.

Referring back to FIGS. 3 and 4, in one exemplary embodiment of a UE, the device 300 includes a program code 312 stored in the memory 310. The CPU 308 could execute program code 312 to enable the UE (i) to transmit a MAC PDU to a network node, wherein the MAC PDU includes at least a first subheader and a first SL BSR associated with a first HARQ feedback mode, and a field of the first subheader indicates the first HARQ feedback mode, (ii) to receive a sidelink grant from the network node, and (iii) to select data from a logical channel for transmission according to a HARQ feedback mode of the logical channel and whether the sidelink grant is associated with a HARQ feedback resource or not. Furthermore, the CPU 308 can execute the program code 312 to perform all of the above-described actions and steps or others described herein.

Figure 27:
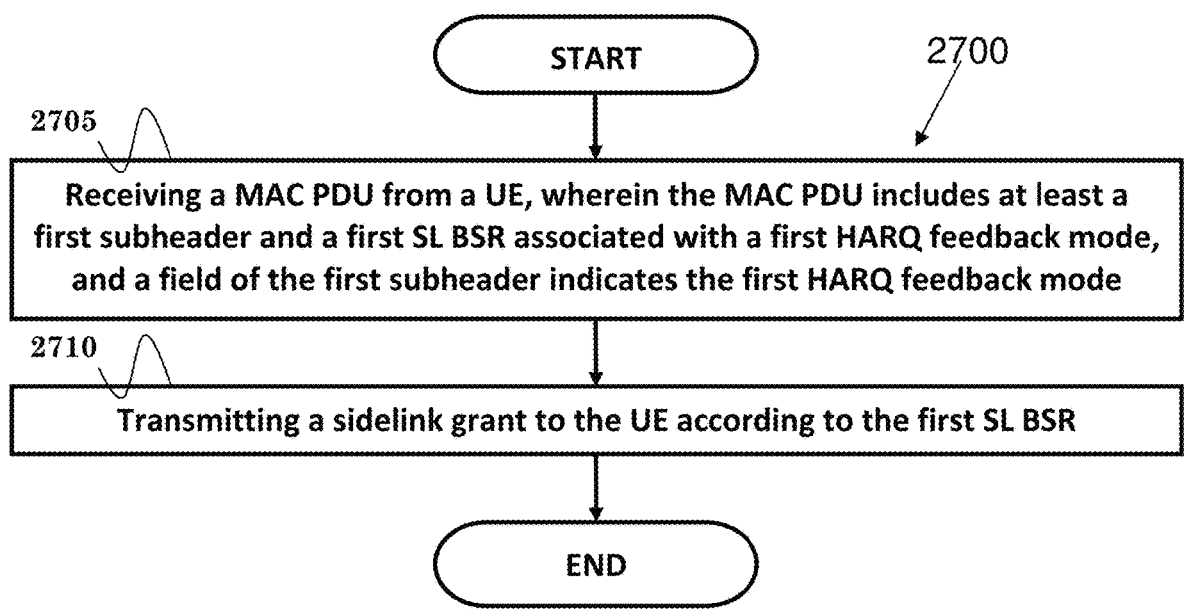
FIG. 27 is a flow chart according to one exemplary embodiment.

FIG. 27 is a flow chart 2700 according to one exemplary embodiment from the perspective of a network node to handle a SL BSR. In step 2705, the network node receives a MAC PDU from a UE, wherein the MAC PDU includes at least a first subheader and a first SL BSR associated with a first HARQ feedback mode, and a field of the first subheader indicates the first HARQ feedback mode. In step 2710, the network node transmits a sidelink grant to the UE according to the first SL BSR.

In one embodiment, whether the sidelink grant is associated with a HARQ feedback resource or not depends on content in the first SL BSR. The network node could transmit a SLRB configuration to the UE, wherein the SLRB configuration configures the UE with a first logical channel associated with HARQ feedback enabled and a second logical channel associated with HARQ feedback disabled. The MAC PDU could further include a second subheader and a second SL BSR associated with a second HARQ feedback mode which is different from the first HARQ feedback mode, and a field of the second subheader indicates the second HARQ feedback mode.

In one embodiment, the network node could transmit a first sidelink grant associated with the HARQ feedback resource to the UE if the (first or second) HARQ feedback mode is enabled. The network node could also transmit a second sidelink grant not associated with the HARQ feedback resource to the UE if the (first or second) HARQ feedback mode is disabled.

In one embodiment, the field of the first or second subheader could indicate the first or second HARQ feedback mode is enabled if the first or second SL BSR includes buffer size(s) of logical channel(s) associated with HARQ feedback enabled, and the logical channel(s) include the first logical channel and do not include the second logical channel. Alternatively, the field of the first or second subheader could indicate the first or second HARQ feedback mode is disabled if the first or second SL BSR includes buffer size(s) of logical channel(s) associated with HARQ feedback disabled, and the logical channel(s) include the second logical channel and do not include the first logical channel.

In one embodiment, the field of the first or second subheader could be used to indicate the HARQ feedback mode is a LCID field. The field of the first or second subheader could also be used to indicate the HARQ feedback mode is a one-bit field.

In one embodiment, the (first) sidelink grant could include frequency domain information of the HARQ feedback resource if the (first) sidelink grant is associated with the HARQ feedback resource. The (first) sidelink grant could also include time domain information of the HARQ feedback resource if the (first) sidelink grant is associated with the HARQ feedback resource.

In one embodiment, the (second) sidelink grant may not include frequency domain information of the HARQ feedback resource if the (second) sidelink grant is not associated with the HARQ feedback resource. Furthermore, the (second) sidelink grant may not include time domain information of the HARQ feedback resource if the (second) sidelink grant is not associated with the HARQ feedback resource.

In one embodiment, the sidelink transmission could further include data from a logical channel with HARQ feedback disabled if the (first) sidelink grant is associated with the HARQ feedback resource. The sidelink transmission may not include data from a logical channel with HARQ feedback enabled if the (second) sidelink grant is not associated with the HARQ feedback resource.

In one embodiment, the network node could be a base station (e.g. gNB).

Referring back to FIGS. 3 and 4, in one exemplary embodiment of a network node, the device 300 includes a program code 312 stored in the memory 310. The CPU 308 could execute program code 312 to enable the network node (i) to receive a MAC PDU from a UE, wherein the MAC PDU includes at least a first subheader and a first SL BSR associated with a first HARQ feedback mode, and a field of the first subheader indicates the first HARQ feedback mode, and (ii) to transmit a sidelink grant to the UE according to the first SL BSR. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE to handle a sidelink buffer status report (SL BSR), comprising:
    transmitting a SL BSR to a network node, wherein a format of the SL BSR includes at least one field of buffer size associated with HARQ (Hybrid Automatic Repeat Request) feedback enabled and one field of buffer size associated with HARQ feedback disabled;
    receiving a sidelink grant from the network node; and
    selecting data from a logical channel for transmission according to a HARQ feedback mode of the logical channel and whether the sidelink grant is associated with a HARQ feedback resource or not.

2. The method of claim 1, wherein the data from the logical channel associated with HARQ feedback enabled is selected if the sidelink grant is associated with a HARQ feedback resource.

3. The method of claim 1, wherein the data from the logical channel associated with HARQ feedback disabled is selected if the sidelink grant is not associated with a HARQ feedback resource.

4. The method of claim 1, further comprising:
    receiving a SLRB configuration from the network node, wherein the SLRB configuration configures the UE with a first logical channel associated with HARQ feedback enabled and a second logical channel associated with HARQ feedback disabled.

5. The method of claim 1, wherein the network node is a base station.

6. A method for a network node to handle a sidelink buffer status report (SL BSR), comprising:
    receiving a SL BSR from a UE (User Equipment), wherein a format of the SL BSR includes at least one field of buffer size associated with HARQ (Hybrid Automatic Repeat Request) feedback enabled and one field of buffer size associated with HARQ feedback disabled; and
    transmitting a sidelink grant to the UE according to the SL BSR.

7. The method of claim 6, wherein whether the sidelink grant is associated with a HARQ feedback resource or not depends on content in the SL BSR.

8. The method of claim 6, further comprising:
    transmitting a SLRB configuration to the UE, wherein the SLRB configuration configures the UE with a first logical channel associated with HARQ feedback enabled and a second logical channel associated with HARQ feedback disabled.

9. The method of claim 6, further comprising:
    transmitting a first sidelink grant associated with the HARQ feedback resource to the UE if the buffer size associated with HARQ feedback enabled in the SL BSR is not empty.

10. The method of claim 6, further comprising:
    transmitting a second sidelink grant not associated with the HARQ feedback resource to the UE if the buffer size associated with HARQ feedback disabled in the SL BSR is not empty.

11. The method of claim 6, wherein the network node is a base station.

12. A method for a network node to handle a sidelink buffer status report (SL BSR), comprising:
    configuring a sidelink logical channel (SL LCH) to a UE, wherein the SL LCH is configured with a HARQ (Hybrid Automatic Repeat Request) feedback mode and mapped to a LCG (Logical Channel Group) according to the HARQ feedback mode, and there are at least two sets of LCGs: one set is associated with HARQ feedback enabled and the other set is associated with HARQ feedback disabled;

receiving a SL BSR from the UE, wherein the SL BSR includes at least one LCG and there is a buffer size per LCG; and transmitting a sidelink grant to the UE according to the SL BSR.

13. The method of claim 12, wherein whether the sidelink grant is associated with a HARQ feedback resource or not depends on content in the SL BSR.

14. The method of claim 12, further comprising:

transmitting a SLRB configuration to the UE, wherein the SLRB configuration configures the UE with a first logical channel associated with HARQ feedback enabled and a second logical channel associated with HARQ feedback disabled, and wherein the SLRB configuration configures the UE to map the first logical channel to a first LCG and map the second logical channel to a second LCG.

15. The method of claim 12, further comprising:

transmitting a first sidelink grant associated with the HARQ feedback resource to the UE if the buffer size associated with HARQ feedback enabled in the SL BSR is not empty.

16. The method of claim 12, further comprising:

transmitting a second sidelink grant not associated with the HARQ feedback resource to the UE if the buffer size associated with HARQ feedback disabled in the SL BSR is not empty.

17. The method of claim 12, wherein the network node is a base station.

* * * * *